United States Patent [19]

Barker

[11] 4,393,451
[45] Jul. 12, 1983

[54] METHOD AND APPARATUS FOR MEASURING TOTAL LIQUID VOLUME FLOW

[75] Inventor: Leland W. Barker, Kingsport, Tenn.

[73] Assignee: Eastman Kodak Company, Rochester, N.Y.

[21] Appl. No.: 235,386

[22] Filed: Feb. 17, 1981

[51] Int. Cl.³ .............................................. G01F 7/00
[52] U.S. Cl. ....................................... 364/510; 73/215
[58] Field of Search ................... 364/510, 509; 73/215, 73/198, 861.66, 861.65

[56] References Cited

U.S. PATENT DOCUMENTS

Re. 29,868 12/1978 Schontzler et al. ................. 364/510
3,996,798 12/1976 Heyden ............................... 73/215 X
4,028,939  6/1977 Fletcher et al. ................. 364/510 X
4,070,563  1/1978 Petroff ................................. 364/510
4,145,914  3/1979 Newman ......................... 364/510 X
4,145,926  3/1979 Martig, Jr. ......................... 73/215 X
4,217,777  8/1980 Newman .............................. 73/198
4,295,197 10/1981 Petroff ................................. 364/510
4,321,826  3/1982 Bibbee et al. ........................ 73/215

*Primary Examiner*—Edward J. Wise
*Attorney, Agent, or Firm*—Malcolm G. Dunn; Daniel B. Reece, III

[57] ABSTRACT

Method for measuring total liquid volume flow in partially full cylindrical pipes, and apparatus for practicing the method.

8 Claims, 5 Drawing Figures

Pipe less than half full (D<R)

Pipe more than half full (D>R)

METHOD AND APPARATUS FOR MEASURING TOTAL LIQUID VOLUME FLOW

DESCRIPTION

1. Technical Field

My invention concerns a method for measuring liquid flow, and particularly to measuring total liquid volume flow in a partially full cylindrical pipe, and to an apparatus for practicing the method.

2. Background Art

Total liquid volume flow measurement has generally been a difficult task. Historically, this measurement has been almost impossible to make in pipelines running partially full. A measurement of both flow velocity and liquid level must be made to calculate total volume flow for this condition. There does not appear to be any acceptable method for making either measurement under these conditions. Nevertheless, volume flow measurement can be very important to process control and is sometimes necessary to satisfy environmental regulations.

One instrument known in the art uses a magnetic sensor to measure flow velocity and uses a bubbler system incorporating a pressure transmitter to measure the liquid level. The total volume flow calculations are made by hardwired logic using discrete components and integrated circuits. In working with this instrument, however, I found that there were problems in getting it to work effectively, such as component failures and undesirable coatings on the magnetic sensor.

One major problem is the failure of discrete components in a multi-component system and integrated circuits in the hardwired electronic logic that performs the flow calculations.

In the use of the magnetic sensor or probe to measure flow velocity, the single point sensor develops a magnetic field only in the immediate area of the probe. The flow velocity through this magentic field causes a voltage to be developed across two points in the probe. Also, in effect, this sensor measures flow velocity in only one small area of the pipeline or pipe. The measured velocity may or may not be close to the average fluid velocity in the pipe since there are different flow velocities in different areas of a pipe. If the measured velocity is not approximately the average fluid velocity, there will be a large error in the total flow output. This occurs because the total volume flow is a function of fluid velocity. Accurate placement of this probe in order to obtain the average velocity would require a detailed knowledge of the flow profile of the pipe. Additionally, any type of obstruction in the pipe alters this flow profile and decreases the accuracy of the flow measurement. Coatings on the probe may also decrease system accuracy by altering the magnetic field in the immediate vicinity of the probe.

In the prior art, U.S. Pat. No. 1,505,050 (1924) discloses a weir for measurement of liquids when the liquid is allowed to pass freely over the weir. The shape of a weir notch is such that the quantity of liquid flowing through the notch at any given instant is directly proportional to the square of the height of such liquid. A float connected to a stylus, the latter in turn marking on a chart, serves to measure the height of the liquid. The physical construction of a weir at the desired point of measurement is costly and may be inconvenient, especially if volatiles are involved.

More recently issued patents, U.S. Pat. Nos. 4,125,020 (1978); 4,127,032 (1978); and 4,145,926 (1979) also disclose other forms of weir arrangements. For instance, in U.S. Pat. No. 4,125,020, a probe is shown positioned in the end of a sewer or water pipe or conduit. The probe is provided with a weir plate and with a bubble tube for sensing the depth of flow over the weir in order to determine the flow rate. The weir is provided with a V-notch formed by two overlapping segment shaped members. The overlapping members serve to stiffen the weir plate against deformation by the liquid flow. The bubble tube is submerged in the liquid flow and is supplied with a gaseous fluid which is forced through an orifice in the bubble tube. The resistance of the outward flow of the gaseous fluid from the bubble tube serves to determine the depth of liquid over the bubble tube. Liquid flow within a conduit is determined through the use of the Manning flow relationship or formula, a well-known concept in fluid dynamics. If the conduit size, the slope of the conduit, the nature of the liquid material and the liquid depth are known, then by use of the Manning formula the flow can be determined.

U.S. Pat. No. 3,996,798 (1976) discloses an apparatus for use in measuring liquid flow quantity in an open channel having a known cross-section by use of a velocity measuring device and a supersonic depth gauge. The supersonic depth gauge emits supersonic energy pulses which are reflected by the liquid surface and senses the traverse time of the signals, thus determining the distance from the depth gauge to the liquid level. At flows above a predetermined level the two devices are coupled to give a flow quantity readout, but below such predetermined level the height measuring device is automatically uncoupled from the velocity measuring device and is coupled to a computer in which the output of the height-measuring device is substituted in a known formula relating height with flow quantity to give a flow quantity readout. A supersonic depth gauge is, of course, more costly to use and maintain than a simple bubble tube system with little increase in accuracy.

DESCRIPTION OF INVENTION

In accordance with the present invention, I provide a method, and an apparatus for practicing the method, by which total volume flow of a liquid in a partially full cylindrical pipe is determined.

The method involves measuring at a predetermined location along the length of the cylindrical pipe the average fluid velocity of the liquid flowing through the cylindrical pipe by making measurements at intervals transversely across the flow of liquid in the cylindrical pipe and determining therefrom the average fluid velocity and generating an electrical output signal representative of this measurement. The depth of the liquid at the same predetermined location is also measured, and an electrical signal representative of this measurement is generated. The electrical output signals from the average fluid velocity and from the depth of liquid measurements are fed to a programmable digital microcomputer and from these the total volume flow of liquid is calculated by solving the following equation, $$\text{Flow} = 1.68 \sqrt{dp} \left( \frac{\pi R^2}{2} - \left[ (R - D) \sqrt{D(2R - D)} + \right. \right.$$

-continued $$R^2\left(\frac{R-D}{R} + 0.166\left(\frac{R-D}{R}\right)^3 + \right.$$

$$\left.\left.0.075\left(\frac{R-D}{R}\right)^5 + 0.045\left(\frac{R-D}{R}\right)^7\right)\right]\right\} \text{ft.}^3/\text{sec.}$$

The measuring of the average fluid velocity of the liquid flowing through the cylindrical pipe involves measuring at the aforementioned predetermined location the liquid flow velocity at a plurality of individual predetermined centers of concentric sections located within the lower half of the cylindrical pipe cross-section laterally spaced generally horizontally across the lower half and then averaging all of the individual velocities as measured. More specifically, the measuring of the liquid flow velocity occurs generally horizontally across the cylindrical pipe and at right angles to the flow of the liquid at a plurality of individual predetermined centers of concentric sections located within the lower half of the cylindrical pipe cross-section laterally spaced across the lower half.

The apparatus for determining total volume flow of a liquid in a partially full cylindrical pipe includes a device positioned at a predetermined location within a cylindrical pipe for measuring the average fluid velocity of liquid flowing through the cylindrical pipe by making measurements at intervals transversely across the flow of liquid in the cylindrical pipe and determining therefrom the average fluid velocity and for generating a first electrical output signal representative of this measurement. A second device at the aforementioned predetermined location measures the depth of liquid at this predetermined location and generates a second electrical signal representative of this measurement. A programmable computer is provided, and an arrangement is provided for feeding the first and second electrical output signals to the programmable computer, which is programmed to receive the output signals and to calculate and to give the total volume flow of the liquid in accordance with the following equation:

$$\text{Flow} = 1.68\sqrt{dp}\left\{\frac{\pi R^2}{2} - \left[(R-D)\sqrt{D(2R-D)} + \right.\right.$$

$$R^2\left(\frac{R-D}{R} + 0.166\left(\frac{R-D}{R}\right)^3 + \right.$$

$$\left.\left.0.075\left(\frac{R-D}{R}\right)^5 + 0.045\left(\frac{R-D}{R}\right)^7\right)\right]\right\} \text{ft.}^3/\text{sec.}$$

The aforementioned first device measures the liquid velocity at a plurality of individual predetermined centers of concentric sections located within the lower half of the cylindrical pipe cross-section laterally spaced generally horizontally across the lower half and averages all of the individual velocities measured. More specifically, the aforementioned first device measures the liquid velocity generally horizontally across the cylindrical pipe and at right angles to the flow of the liquid at a plurality of individual predetermined centers of concentric sections located within the lower half of the cylindrical pipe cross-section laterally spaced across the lower half and averages all of the individual velocities measured.

The aforementioned first device includes a Pitot tube type sensor, and the aforementioned second device includes a bubbler tube.

The arrangement for feeding electrical input signals to a programmable computer includes a differential pressure transmitter for each of the Pitot tube type sensor and the bubbler tube.

BRIEF DESCRIPTION OF DRAWINGS

The details of my invention will be described in connection with the accompanying drawings, in which.

BEST MODE FOR CARRYING OUT THE INVENTION

Figure 1:
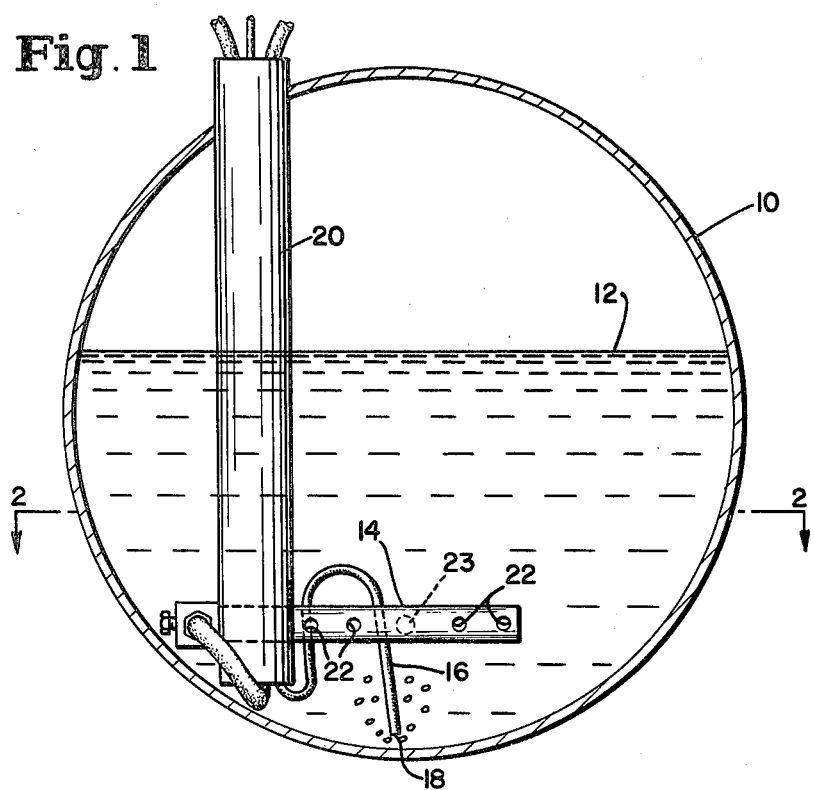
FIG. 1 is an elevational view in cross-section of a cylindrical pipe partially full of a flowing liquid and illustrating the flow sensor for measuring average fluid velocity of the liquid and the bubbler tube for measuring the depth of the liquid.
Figure 2:
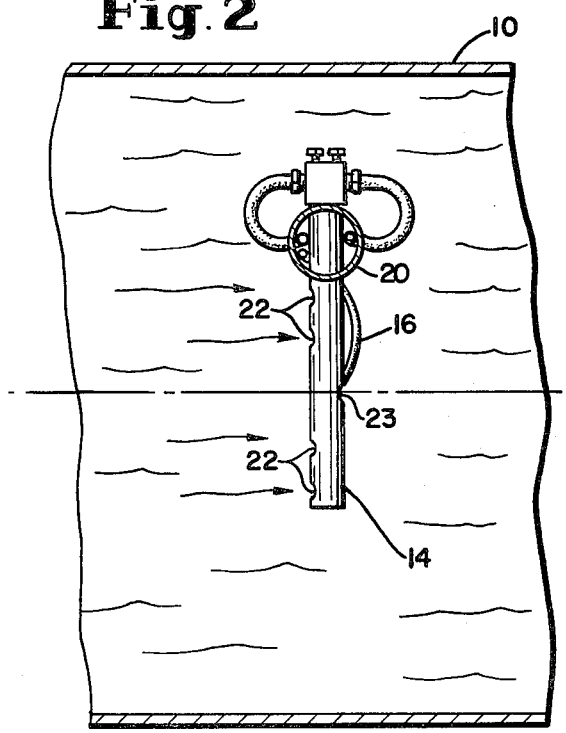
FIG. 2 is a plan view partly in cross-section of the view in FIG. 1.

In reference to the drawings, in FIGS. 1 and 2 a cylindrical pipe 10 is illustrated as being partially filled with a flowing liquid 12. A flow sensor 14, which measures the average fluid velocity of the flowing liquid, is shown located within the lower half of the cylindrical pipe below the normal expected level of the flowing liquid and extending generally horizontally across the cylindrical pipe at right angles to the flow of the liquid. A bubbler tube 16, which measures the depth of the flowing liquid, is shown located adjacent the flow sensor 14 with its opening 18 at its lower end near the lowest point in the cylindrical pipe 10. Both the flow sensor 14 and the bubbler tube 16 are supported and held at the desired predetermined location in the cylindrical pipe by a hollow support post 20.

A plurality of similarly configured openings or impact openings 22 are spaced laterally along the length of the flow sensor 14 and are positioned so as to face in an upstream direction with respect to the flowing liquid. The location of these spaced openings is selected at predetermined centers of concentric sections of the flowing liquid in the cylindrical pipe, as in the manner described, for instance, in U.S. Pat. No. 3,581,565. The flow sensor is a Pitot tube type flow measuring device, which, in addition to the laterally spaced impact openings shown in FIG. 1, also includes a static probe (not shown) having an opening 23, which faces downstream, as shown in FIG. 2; and an interpolating or averaging tube (not shown). The details of construction and operation of these two latter-mentioned elements are disclosed in U.S. Pat. No. 3,581,565 to which reference may be made. For purposes of this disclosure, however, it is considered sufficient to describe that tubing is connected between the interpolating or averaging tube (not shown) and the high pressure port of a differential pressure transmitter 24, and between the downstream element or static probe (not shown) of the flow sensor and the low pressure port of the differential pressure transmitter 24, as diagrammatically illustrated in FIG. 5. A small flow of air is bubbled out of the interpolating tube and the static probe, and the differential pressure transmitter detects the difference in tube air pressure.

The bubbler tube 16 is a well-known device used in industries where liquid processing is involved. One end of the bubbler tube is positioned as close as practical to the lowermost portion of the cylindrical pipe and is open at its end, and the other end of the bubbler tube is connected to the high pressure port of a differential pressure transmitter 26. A small flow of air is introduced into the bubbler tube, and the pressure in the tube will increase until it equals the external pressure on the open end of the bubbler tube. When this pressure is reached, any additional air flow in the tube will bubble out of the open end. The pressure in the tubing is directly proportional to the height of the column of liquid above the open end of the tubing. The pressure detected by the differential pressure transmitter, therefore, is directly proportional to the liquid level in the pipe.

Each of the differential pressure transmitters 24,26 (such as a Model 1151 DP Alphaline Differential Pressure Transmitter, Rosemount Inc., Minneapolis, Minn.) uses a capacitance sensor. The high and low pressures from the process connections are transmitted through isolating diaphragms and sealed fill fluid to a sensing diaphragm in the center of the sensing element. This sensing diaphragm deflects in response to the differential pressure across it. This deflection is detected by fixed capacitor plates on both sides of the sensing diaphragm. The diaphragm is actually the second plate for both of these capacitors. Current output is proportional to this deflection.

The differential pressure transmitters 24,26 may be connected, in turn, to a microcomputer 28, into which the flow calculations are programmed, such as an RMC 80/10 Microcomputer, National Semiconductor Corp., Santa Clara, Calif. This is a packaged microcomputer comprising five units, which include a BLC-80/10 Board Level Computer, a BLC-910 System Monitor for loading, executing and debugging programs, a BLC-635 power supply, a BLC604 four-slot card cage, and front panel controls. The microcomputer in turn may be connected to a suitable recorder 30, as shown in the block diagram in FIG. 5. The recorder 30 may be in the nature of a strip chart recorder so as to provide a record of the total flow. A power supply is shown at 32.

Figure 5:
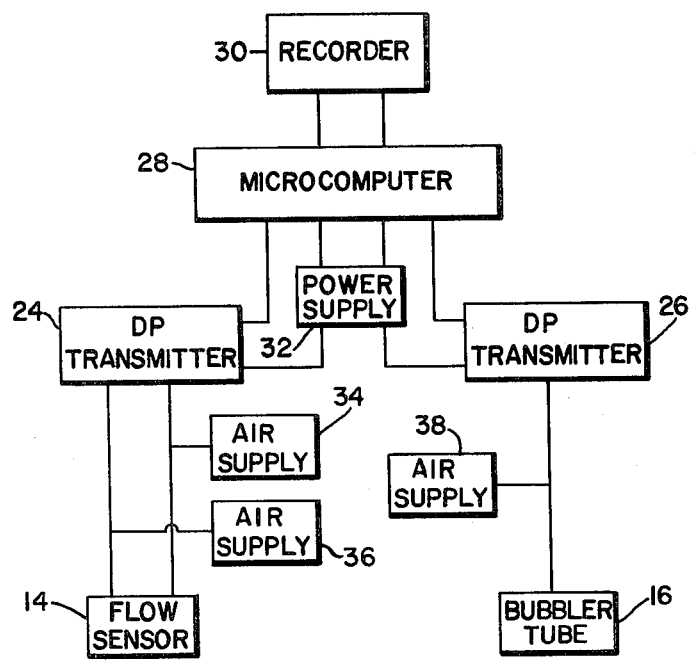
FIG. 5 is a block diagram illustrating the electrical hookup system for the apparatus of the invention.

The various tube connections from the flow sensor 14 and the bubbler tube 16 may extend upwardly through the hollow support post 20 for subsequent connection to the differential pressure transmitters, as illustrated in part in FIG. 1. Air may be supplied to the flow sensor 14 through units 34 and 36 (FIG. 5) while the air supply for the bubbler tube 16 may be supplied through unit 38 (FIG. 5).

In order to understand the operation of the invention, a theoretical analysis of the pertinent aspects to be considered will be helpful.

a. General Flow Equation

The volume flow rate in a partially filled pipe is the volume of liquid that flows past any point in unit time and is written as [d(vol)/dt]. This can be written as [d(l·area)/dt] since the volume of any figure with a constant cross-sectional area is equal to the length (l) times the cross-sectional area. The average distance that a fluid moves in unit time is l. For a constant cross-sectional area, the volume rate [d(vol)/dt] can be rewritten as area×(dl/dt) where (dl/dt) equals the average velocity of the fluid. One can then write $$\text{flow} = [d(\text{vol})/dt] = \text{velocity} \times \text{area} \qquad (1)$$

b. Cross-Sectional Area Derivation

In a cylindrical pipe, the cross-sectional area can be calculated from the radius of the pipe and the depth of the liquid. A formula for the cross-sectional area is developed for Case 1 where the liquid depth is less than R, the pipe radius, and for Case 2, where the depth is greater than R.

Figure 3:
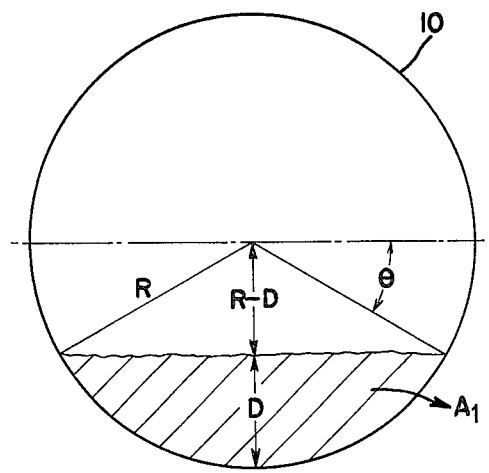
FIG. 3 is a diagrammatic view illustrating a cylindrical pipe less than half full of a flowing liquid.

From FIG. 3 it is obvious for Case 1, $D<R$, that the total cross-sectional area of the fluid is equal to the cross-sectional area of the bottom half of the pipe minus the sum of the area of the triangle and the areas of the two sectors included in the lower semicircular area. This is written as $$A_1 = \text{bottom semicircle} - (\text{triangle} + 2 \text{ sectors})$$

Substituting in the area formulas gives $$A_1 = \frac{\pi R^2}{2} - \left[ (R-D)\sqrt{R^2 - (R-D)^2} + 2\left(\frac{\theta}{2\pi}\right)(\pi R^2) \right] \qquad (2)$$

$$= \frac{\pi R^2}{2} - (R-D)\sqrt{R^2 - (R^2 - 2RD + D^2)} - \theta R^2$$

Since $\sin \theta = \frac{R-D}{R}, \theta = \sin^{-1}\left(\frac{R-D}{R}\right)$ $$A_1 = \frac{\pi R^2}{2} - (R-D)\sqrt{2RD - D^2} - R^2 \sin^{-1}\left(\frac{R-D}{R}\right)$$

$$= \frac{\pi R^2}{2} - \left[ (R-D)\sqrt{D(2R-D)} + R^2 \sin^{-1}\left(\frac{R-D}{R}\right) \right],$$

$$\left( 0 \leq \frac{R-D}{R} \leq 1 \right)$$

Figure 4:
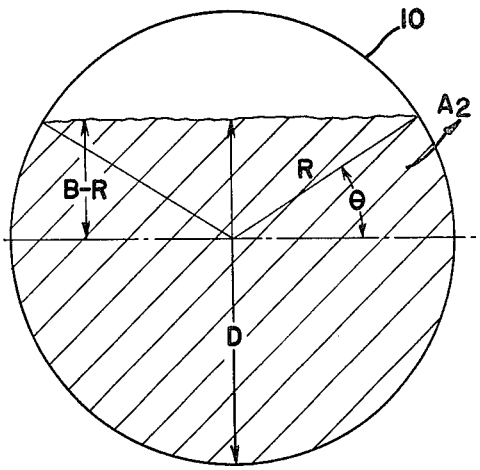
FIG. 4 is a diagrammatic view of a cylindrical pipe more than half full of a flowing liquid.

From FIG. 4, it is obvious for Case 2, $D>R$, that the total cross-sectional area of the fluid is equal to the cross-sectional area of the bottom half of the pipe plus the sum of the area of the triangle and the areas of the sectors included in the upper semicircular area. This is written as $$A_2 = \text{bottom semicircle} + (\text{triangle} + 2 \text{ sectors})$$

Substituting in the area formulas gives $$A_2 = \frac{\pi R^2}{2} + \left[ (D-R)\sqrt{R^2 - (D-R)^2} + 2\left(\frac{\theta}{2\pi}\right)(\pi R^2) \right]$$

$$= \frac{\pi R^2}{2} + (D-R)\sqrt{R^2 - (D^2 - 2RD + R^2)} + \theta R^2$$

-continued

Again, $\theta = \sin^{-1}\left(\dfrac{R-D}{R}\right)$ so $$A_2 = \dfrac{\pi R^2}{2} + (D-R)\sqrt{2RD - D^2} + R^2 \sin^{-1}\left(\dfrac{D-R}{R}\right)$$

Since $\sin(-x) = -\sin x$ and $D - R = -(R - D)$ $$A_2 = \dfrac{\pi R^2}{2} - (R-D)\sqrt{D(2R-D)} - R^2 \sin^{-1}\left(\dfrac{R-D}{R}\right) \quad (3)$$

$$= \dfrac{\pi R^2}{2} - \left[(R-D)\sqrt{D(2R-D)} + R^2 \sin^{-1}\left(\dfrac{R-D}{R}\right)\right],$$

$$\left(-1 \leq \dfrac{R-D}{R} \leq 0\right)$$

Equation 3 from Case 2 is identical to Equation 2 from Case 1 so the area can be written as $$A = \dfrac{\pi R^2}{2} - \left[(R-D)\sqrt{D(2R-D)} + R^2 \sin^{-1}\left(\dfrac{R-D}{R}\right)\right], \quad (4)$$

$$\left(-1 \leq \dfrac{R-D}{R} \leq 1\right)$$

The equations for the area of a semicircle, a triangle, and a sector of a circle are included in many mathematical tables such as "CRC Standard Mathematical Tables" (Edition 14; Editor, Samuel L. Selby; pp. 409, 490 and 492; Chemical Rubber Co., Cleveland, Ohio). The most important point in the derivations was recognizing that both total area equations could be written in identical form. This is thought to be an original contribution that greatly simplified flow computations.

c. Sensors

In reference to FIG. 1, the liquid level, D, is preferably measured using a bubbler tube 16. Liquid level is measured extensively by this method in the chemical industries. It has proven extremely reliable and accurate. Other acceptable methods of determining liquid levels exist but standard instrumentation is not available to convert the measurement to an electrical signal. In this method the low pressure connection of differential pressure transmitter 26 is left open to the atmosphere. A length of tubing is then connected by one end to the high pressure port of the differential pressure transmitter. The other end of the tubing is positioned within the bottom half of the pipe near the bottom of the cylindrical pipe 10 in which the level measurement is to be made and left open. A connection is made in this tubing so that a small flow of air may be introduced. Due to this air flow, as heretofore mentioned, the pressure in the tubing will increase until it exactly equals the external pressure on the open end of the tubing. At this pressure, any additional air flow into the tubing will bubble out the end. The pressure in the tubing is directly proportional to the height of the column of water above the open end of the tubing. Therefore, the pressure detected by the differential pressure transmitter is directly proportional to the liquid level in the pipe.

The fluid velocity is measured by the flow sensor 14, such as an Annubar primary sensor, which is manufactured by Dieterich Standard Corporation, Ellison Instrument Division. In using a flow sensor of this type, sensor problems encountered with other commercial flowmeters were found to be eliminated. This sensor has multiple ports so that an average flow velocity may be obtained. The averaging is done by the sensor probe itself instead of by flowmeter electronics, thus simplifying the calculations. Since all the ports are located in one element, only a single sensor probe must be placed and anchored in the stream. In addition, coatings will not affect the sensor probe unless one or more of the ports is completely blocked. Although an obstruction in front of any one port can cause an error in the velocity measurement, the total measurement will be only marginally affected since the pressure at any one port is averaged with the pressure at the three other ports.

A 20% pressure error caused by a flow disturbance at one port would be reduced to an overall error of 5%. This effect can be demonstrated very simply. In the case where the pressure is equal to 20" $H_2O$ at all ports, the average is also 20" $H_2O$. If, however, a 20% error exists at one port, the pressure at that port will be 16" $H_2O$ or 24" $H_2O$. The error at that port is 4" $H_2O$. When 16" $H_2O$ is averaged with the pressure at the other three ports, the result is $(16+20+20+20)/4$, or 19" $H_2O$. When 24" $H_2O$ is averaged with the pressure at the other three ports, the result is $(24+20+20+20)/4$, or 21" $H_2O$. In both cases the error is now 1" $H_2O$, $\tfrac{1}{4}$ the original error, and is only a 5% error. This sensor can be described as two pitot tubes that use the concept of annular averaging. The input probe is designed to measure the average velocity of the flowing fluid. Four ports are located in an upstream direction, facing the direction of the flow. The pressures at these four ports are averaged by an interpolating tube or pitot tube inside the sensor. This pitot tube, which points toward the ports, measures the pressure inside the sensor caused by flow velocity at the four ports. The difference in pressure between that in the interpolating tube and a downstream pointing pitot tube is the average pressure difference of the total flow.

This pressure difference is measured by using the separate differential pressure transmitter 24. Tubing is connected between the interpolating tube and the high pressure port of the transmitter. Another length of tubing is connected between the downstream element of the flow sensor and the low pressure port of the transmitter. Air is bubbled out the interpolating tube and the downstream element in a manner similar to that used to measure liquid level. The transmitter detects difference in tubing air pressures, which is exactly equal to the pressure difference in the sensing element.

Total flow calculations can then be made using these differential pressure measurements which yield depth and velocity information.

d. Specific Flow Equation

For two pitot tubes, one facing upstream and one downstream, $V = K\sqrt{dp}$. dp is the differential pressure between the two tubes, V is the flow velocity of the liquid and K is a constant for the particular sensor. For an 8-inch flow sensor $$Q_n = SND^2 F_a F_m F_p \sqrt{\frac{G_F}{G_1}} \sqrt{dp} = \frac{d(\text{vol})}{dt}$$

$Q_n$ = volume flow rate in cfm for a full pipe
S = constant for a flow sensor for 8-inch pipe = 0.72734 = $K_g F_v$
N = grouped constants depending upon units for $Q_n$ = 0.7576
D = diameter of pipe in inches
$F_a$ = expansion-contraction factor for pipe ≈ 1
$F_m$ = manometer correction factor ≈ 1
$F_p$ = correction for compressibility of flowing liquid = 1 for water
$G_p$ = specific gravity of liquid at flowing temperature as compared to water at 60° F. ≈ 1 in our case
$G_l$ = specific gravity of liquid at 60° F. as compared to water at 60° F.

We can derive velocity by noting $$V = \frac{d(\text{vol})}{dt \times \text{area}}.$$

Then $$V(\text{ft./sec.}) = \frac{Q_n(\text{cfm})}{60\left[\pi\left(\frac{1}{3}\right)^2\right]} \approx \frac{SND^2}{60\left[\pi\left(\frac{1}{3}\right)^2\right]} \sqrt{dp}$$

$$= \frac{(0.72734)(0.7576)8^2}{(60)\left[\pi\left(\frac{1}{3}\right)^2\right]} \sqrt{dp} = 1.68 \sqrt{dp} \text{ ft./sec.}$$

So from $V_{avg} = K\sqrt{dp}$ ft./sec., we see K ≈ 1.68 ft./(sec.$\sqrt{\text{in H}_2\text{O}}$) for a flow sensor in a full pipe.

Since the pipe cross-sectional area has been removed from the above equation, only S might be different for a partially full pipe where
$S = K_g F_v$ $K_g$ is a geometrical correction factor for the flow sensor and does not vary if the pipe is only partially full. $F_v$ is the velocity distribution factor in the pipe. For a full pipe, this factor is given by $$F_v = \frac{2n^2}{(2n + 1)(n + 1)}$$

for a 1/nth power law turbulent flow.

For flow sensor calculations, the pipe is assumed to follow a 1/7th power law or $$\frac{V_i}{V_{max}} = \left(\frac{y_i}{R}\right)^{\frac{1}{7}}$$

$V_i$ = velocity at the ith port
$V_{max}$ = centerline velocity
$y_i$ = distance from wall to ith hole
R = pipe radius Any changes in K caused by deviations from this velocity distribution in a partially filled pipe will be corrected for by field calibrations of the differential pressure (dp) transmitter since the changes can be lumped as some constant multiple of the differential pressure. When K is not equal to 1.68, K = 1.68 $K_1$ so that $V_{avg}$ = 1.68-$K_1\sqrt{dp_1}$. Then $$V_{avg} = 1.68 \sqrt{K_1^2 dp_1}$$

$$= 1.68 \sqrt{dp} \text{ ft./sec.}$$

From Equation 1, flow = velocity$_{(avg.)}$ × area and substituting Equation 4 for area and Equation 5 for velocity, I get $$\text{Flow} = 1.68 \sqrt{dp} \left\{ \frac{\pi R^2}{2} - \left[ (R - D)\sqrt{D(2R - D)} + R^2 \sin^{-1}\left(\frac{R - D}{R}\right) \right] \right\} \text{ ft.}^3/\text{sec.}$$

when R and D are expressed in feet. I approximate arcsine by a series truncated after four terms $$\sin^{-1}(x) \approx x + \frac{x^3}{6} + \frac{3}{40} x^5 + \frac{15}{336} x^7 \quad (-1 \leq x \leq 1) \quad [1]$$

$$= x + 0.166 x^3 + 0.075 x^5 + 0.045 x^7$$

$$\text{Flow} \approx 1.68 \sqrt{dp} \left\{ \frac{\pi R^2}{2} - \left[ (R - D)\sqrt{D(2R - D)} + \right. \right. \tag{6}$$

$$R^2 \left( \frac{R - D}{R} + 0.166 \left( \frac{R - D}{R} \right)^3 + \right.$$

$$\left. \left. 0.075 \left( \frac{R - D}{R} \right)^5 + 0.045 \left( \frac{R - D}{R} \right)^7 \right) \right] \right\} \text{ ft.}^3/\text{sec.}$$

This calculation for total volume flow can be made using only the differential pressure information obtained by the flow sensor and the depth information obtained by the bubbler tube system.

e. Maximum Error Due to Truncated Series

To find the maximum error in the truncated series, I find the maximum of $$F(x) - \sin^{-1} x - \left( x + \frac{x^3}{6} + \frac{3}{40} x^5 + \frac{15}{336} x^7 \right)$$

$$\frac{d}{dx}\left[ \sin^{-1} x - \left( x + \frac{x^3}{6} + \frac{3}{40} x^5 + \frac{15}{336} x^7 \right) \right] = 0$$

$$\frac{1}{\sqrt{1 - x^2}} - \left( 1 + \frac{1}{2} x^2 + \frac{3}{8} x^4 + \frac{105}{336} x^6 \right) = 0$$

$$1 - \sqrt{1 - x^2} \left( 1 + \frac{1}{2} x^2 + \frac{3}{8} x^4 + \frac{105}{336} x^6 \right) = 0$$

$$1 = \sqrt{1 - x^2} \left( 1 + \frac{1}{2} x^2 + \frac{3}{8} x^4 + \frac{105}{336} x^6 \right)$$

-continued

I square both sides
$$1 = (1 - x^2)(1 + x^2 + x^4 + x^6 + 0.453125\, x^8 + 0.234375\, x^{10} + 0.09765625\, x^{12})$$
$$= 1 + x^2 + x^4 + x^6 + 0.453125\, x^8 + 0.234375\, x^{10} + 0.09765625\, x^{12} - x^2 - x^4 - x^6 - x^8 - 0.453125\, x^{10} - 0.234375\, x^{12} - 0.09765625\, x^{14}$$
$$0 = -0.546875\, x^8 - 0.21875\, x^{10} - 0.13671875\, x^{12} - 0.09765625\, x^{14}$$
$$= -x^8 (0.546875 + 0.21875\, x^2 + 0.13671875\, x^4 + 0.0976525\, x^6)$$

There is no solution other than x=0 which is a minimum since there is 0 error at this point.

$$f(0) - \sin^{-1}(0) - 0 = 0$$

f(x) must then be a maximum at the boundary points −1 and +1. In my equations $x = (R - D/R)(-1 \leq X \leq 1)$ $$f(-1) = \sin^{-1}(-1) - \left[-1 + \frac{(-1)^3}{6} + \frac{3}{40}(-1)^5 + \frac{15}{336}(-1)^7\right]$$

$$f(-1) = -0.284487$$
$$\sin^{-1}(-1) = -1.570796$$

$$\% \text{ error} = \frac{-0.284487}{-1.570796} \times 100 = 18\% \text{ at } x = -1$$

$$f(1) = \sin^{-1}(1) - \left[1 + \frac{1}{6} + \frac{3}{40} + \frac{15}{336}\right]$$

$$f(1) = 0.284487$$
$$\sin^{-1}(1) = 1.570796$$

$$\% \text{ error} = \frac{0.284487}{1.570796} \times 100 = 18\% \text{ at } x = 1$$

However, the % error in area is much smaller. From $$A = \frac{R^2}{2} - \left[(R - D)\sqrt{D(2R - D)} + R^2 \sin^{-1}\left(\frac{R - D}{R}\right)\right]$$

$$A \approx \frac{\pi R^2}{2} - \left\{(R - D)\sqrt{D(2R - D)} + R^2\left[\frac{R - D}{R} + 0.166\left(\frac{R - D}{R}\right)^3 + 0.075\left(\frac{R - D}{R}\right)^5 + 0.045\left(\frac{R - D}{R}\right)^7\right]\right\}$$

For a full pipe where $$D = 2R, \quad x = \frac{R - D}{R} =$$

−1 the exact area = $\pi R^2 = 3.141593\, R^2$.

In my approximation, $$\text{area} \approx \frac{\pi R^2}{2} - [(-R)\sqrt{0} + R^2[-1 + 0.166(-1)^3 + 0.075(-1)^5 + 0.045(-1)^7]$$

-continued $$= \frac{\pi R^2}{2} - R^2[-1.286] = 2.856796\, R^2$$

$$\% \text{ of full scale error} = \frac{(3.141593 - 2.856796)}{3.141593\, R^2} R^2 \times 100 = 9.06\%$$

For an empty pipe where D=0, $x = (R - D/R) = 1$ the exact area = 0. In my approximation, $$\text{area} \approx \frac{\pi R^2}{2} - [R\sqrt{0} + R^2(1 + 0.166 + 0.075 + 0.045)]$$

$$= \frac{\pi R^2}{2} - R^2[-1.286000]$$

$$= R^2[0.284796]$$

$$\% \text{ of full scale error} = \frac{0.284796\, R^2}{3.141593\, R^2} = 9.06\%$$

It is now seen that using only four terms restricts the maximum error to 9% in the calculations of the cross-sectional area.

The invention has been described in detail with particular reference to preferred embodiments thereof, but it will be understood that variations and modifications can be effected within the spirit and scope of the invention.

I claim:

1. The method of determining total volume flow of a liquid in a partially full cylindrical pipe, the method comprising measuring at a predetermined location along the length of said cylindrical pipe the average fluid velocity of the liquid flowing through said cylindrical pipe by making measurements at intervals transversely across the flow of liquid in the cylindrical pipe and determining therefrom said average fluid velocity and generating an electrical output signal representative of this measurement;

measuring the depth of liquid at said predetermined location in said cylindrical pipe and generating an electrical signal representative of this measurement; and feeding the electrical output signals from said average fluid velocity and from said depth of liquid measurements to a programmable digital microcomputer and thereby calculating the total volume flow of said liquid by solving the following equation:

$$\text{Flow} = 1.68 \sqrt{dp} \left\{ \frac{\pi R^2}{2} - \left[(R - D)\sqrt{D(2R - D)} + R^2\left(\frac{R - D}{R} + 0.166\left(\frac{R - D}{R}\right)^3 + 0.075\left(\frac{R - D}{R}\right)^5 + 0.045\left(\frac{R - D}{R}\right)^7\right)\right]\right\} \text{ ft.}^3/\text{sec.}$$

wherein the terms are defined as dp = proportional to the average velocity of flowing fluid R = radius of pipe D = depth of the liquid.

2. The method as defined in claim 1, wherein said measuring the average fluid velocity of the liquid flowing through said cylindrical pipe comprises measuring at said predetermined location the liquid flow velocity at a plurality of individual predetermined centers of concentric sections located within the lower half of the cylindrical pipe cross-section laterally spaced generally horizontally across said lower half, and then averaging all of the individual velocities as measured.

3. The method as defined in claim 1, wherein said measuring the average fluid velocity of the liquid flowing through said cylindrical pipe comprises measuring at said predetermined location the liquid flow velocity generally horizontally across the cylindrical pipe and at right angles to the flow of the liquid at a plurality of individual predetermined centers of concentric sections located within the lower half of the cylindrical pipe cross-section laterally spaced across said lower half, and then averaging all of the individual velocities as measured.

4. Apparatus for determining total volume flow of a liquid in a partially full cylindrical pipe, said apparatus comprising a first means positioned at a predetermined location within a cylindrical pipe for measuring the average fluid velocity of liquid flowing through said cylindrical pipe by making measurements at intervals transversely across the flow of liquid in the cylindrical pipe and determining therefrom said average fluid velocity and for generating a first electrical output signal representative of this measurement;

a second means at said predetermined location for measuring the depth of liquid at said predetermined location and for generating a second electrical signal representative of this measurement;

a programmable computer means;

means for feeding said first and second electrical output signals to said programmable computer means;

said programmable computer means being programmed to receive said first and second electrical output signals and to calculate and give the total volume flow of said liquid in accordance with the following equation:

$$\text{Flow} = 1.68 \sqrt{dp} \left\{ \frac{\pi R^2}{2} - \left[ (R - D) \sqrt{D(2R - D)} + R^2 \left( \frac{R - D}{R} + 0.166 \left( \frac{R - D}{R} \right)^3 + 0.075 \left( \frac{R - D}{R} \right)^5 + 0.045 \left( \frac{R - D}{R} \right)^7 \right) \right] \right\} \text{ ft.}^3/\text{sec.}$$

wherein the terms are defined as dp = proportional to the average velocity of flowing fluid
R = radius of pipe
D = depth of the liquid.

5. Apparatus as defined in claim 4, wherein said first means measures the liquid velocity at a plurality of individual predetermined centers of concentric sections located within the lower half of the cylindrical pipe cross-section laterally spaced generally horizontally across said lower half and averages all of the individual velocities measured.

6. Apparatus as defined in claim 4, wherein said first means measures the liquid velocity generally horizontally across the cylindrical pipe and at right angles to the flow of the liquid at a plurality of individual predetermined centers of concentric sections located within the lower half of the cylindrical pipe cross-section laterally spaced across said lower half and averages all of the individual velocities measured.

7. Apparatus as defined in claim 4, wherein said first means includes a pitot tube type sensor means and said second means includes a bubbler tube means.

8. Apparatus as defined in claim 7, wherein said means for feeding electrical input signals include a differential pressure transmitter means for said pitot tube type sensor means and a differential pressure transmitter means for said bubbler tube means.

* * * * *